Sept. 22, 1942.  W. P. LEAR  2,296,285
RADIO AZIMUTH INDICATOR
Filed Dec. 28, 1939  2 Sheets-Sheet 1
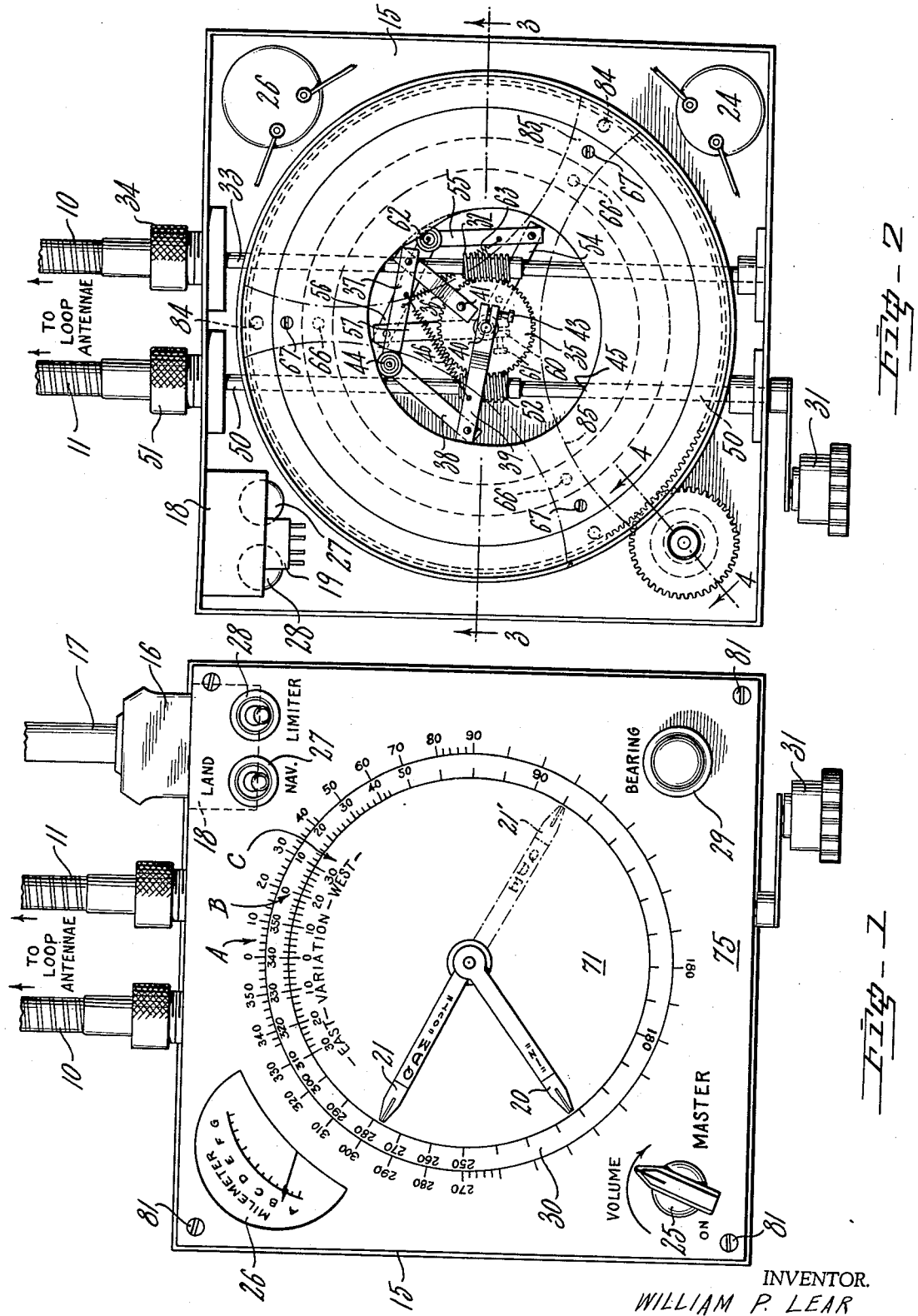
INVENTOR.
WILLIAM P. LEAR
BY Richard A. Marsen
ATTORNEY.

Sept. 22, 1942.  W. P. LEAR  2,296,285
RADIO AZIMUTH INDICATOR
Filed Dec. 28, 1939  2 Sheets-Sheet 2
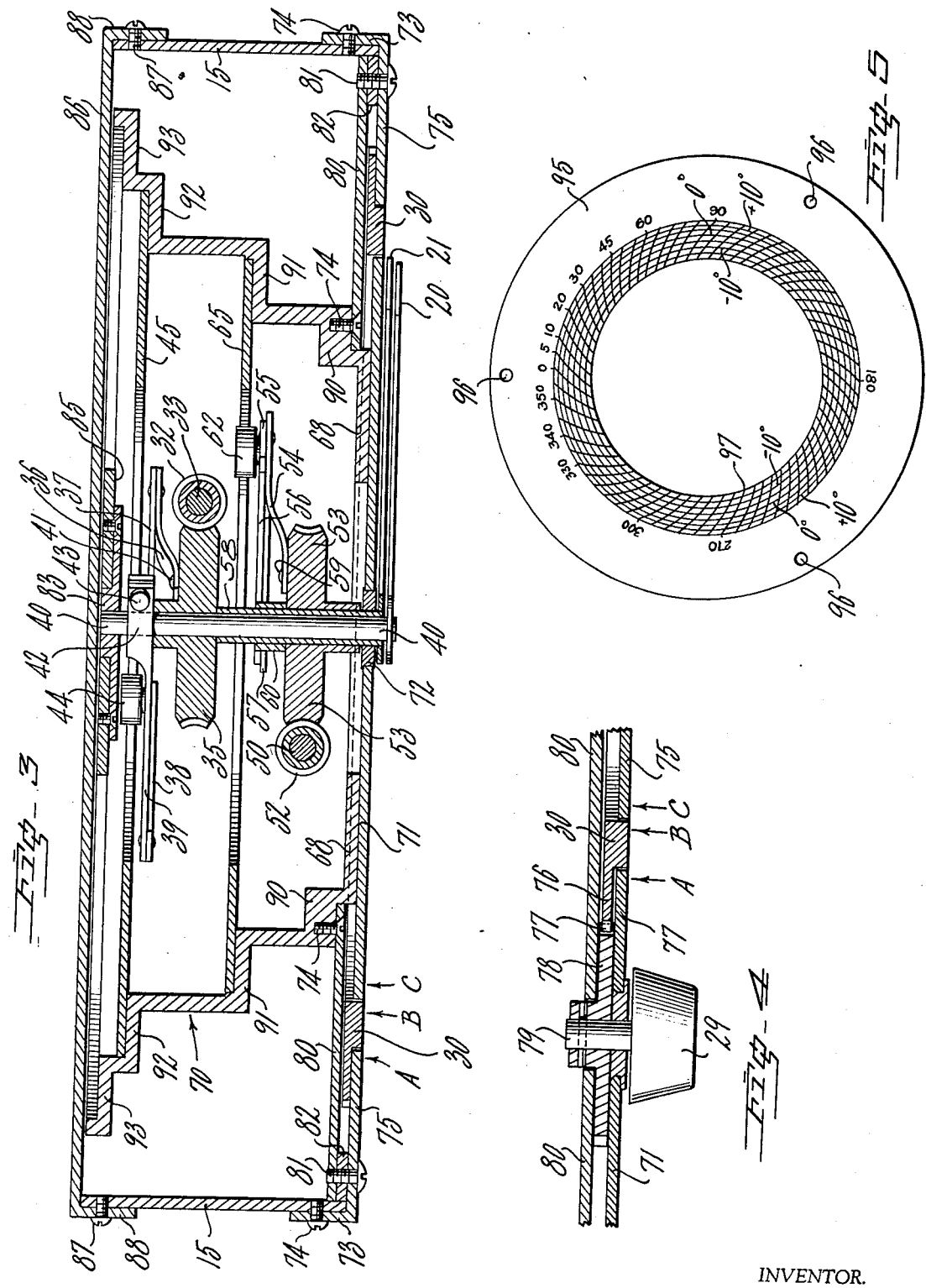
INVENTOR.
WILLIAM P. LEAR
BY
Richard A. Marse
ATTORNEY.

Patented Sept. 22, 1942

2,296,285

UNITED STATES PATENT OFFICE 2,296,285

RADIO AZIMUTH INDICATOR

William P. Lear, Dayton, Ohio, assignor, by mesne assignments, to Lear Avia, Inc., Piqua, Ohio, a corporation of Illinois Application December 28, 1939, Serial No. 311,313

9 Claims. (Cl. 250—11)

This invention relates to azimuthal indicators for radio direction finders and more particularly relates to novel dual indicators combined with azimuthal compensators for radio direction finders and airport localizer systems.

The dual azimuthal indicator of the present invention is particularly applicable for use with radio lateral guidance and airport localizer receiver systems such as disclosed in my copending applications Serial Nos. 291,807 and 306,315, filed on August 25, 1939, and November 27, 1939, respectively, and assigned to the same assignee as this case. In such systems, two independently rotatable directional antennae are used with individual indicator needles arranged to give the lateral guidance indications. In accordance with the present invention, I provide a dual indicator having two coaxial pointers, each mechanically coupled to a rotatable directional antenna. A novel, rugged, foolproof azimuthal or quadrantal error compensator is mechanically coupled between each indicator needle and its directional antennae to correct for possible bearing errors due to non-symmetrical metallic surroundings about the directional antennae. A separate quadrantal error compensator is used for each rotatable antenna coaxially mounted for ready accessibility.

Other practical features are incorporated in the indicator arrangement of my invention. The housing of the indicator is used as a junction box and control head incorporating controls for the radio guidance system. A separate adjustable scale, concentric with the main bearing scale, is arranged in a floating position in the cover of the indicator to give readings corrected for magnetic deviations, as will be explained hereinafter. The combination indicator-control head is arranged for horizontal or vertical mounting in the cockpit of the aircraft.

The foregoing and other features, advantages and objects of the present invention will be apparent in the following detailed description of a preferred embodiment thereof illustrated in the drawings, in which:

Fig. 1 is a front face view of the indicator.

Fig. 2 is a bottom view of the indicator, with the base removed.

Fig. 3 is an enlarged cross-sectional view through the indicator showing the associated quadrantal error corrector mechanisms, taken along the line 3—3 of Fig. 2.

Fig. 4 is an enlarged cross-sectional view through the bearing adjustor of the indicator, taken along the line 4—4 of Fig. 2.

Fig. 5 illustrates a cam plate inscribed with a chart for calibration.

The indicator of the present invention may be used with a radio lateral guidance or runway localizer system employing two rotatable directional antennae. Two indicator needles are operated by the rotatable antennae to effect the lateral guidance and runway localizing indications. Such system, for example, is the basis of my copending applications, Serial Nos. 291,807 and 306,315 hereinabove referred to. Each of the two rotatable antennae is coupled to a corresponding mechanical cable 10 and 11, in turn mechanically coupled to indicator needles 20 and 21 respectively of the indicator constituting the illustrated embodiment of the invention.

Mechanical cables 10 and 11 are essentially flexible transmission shafts and correspond to, for example, shafts 31, 31' of Fig. 2, or shafts 58, 68 of Fig. 3 of my application, Serial No. 291,807. Indicator needles 20, 21 give the lateral guidance indications for the blind radio approach and landing maneuvers set forth in this application. The angular positions which needles 20, 21 assume, are made to correspond to the angular positions of the associated directional antennae at any given instant. The orientations of the directional antennae in turn depend upon the lateral position of the aircraft with respect to the associated ground transmitter stations.

Indicator needle 20, marked "In", is mechanically coupled to the loop antenna tuned to the "inner" ground radio transmitter station; and indicator needle 21, marked "Out," to the "outer" ground radio transmitter station of the lateral guidance system. The indicator of my present invention is applicable for direction finding systems in general. Only a single indicator needle, such as needle 21 coupled to flexible shaft 11, may be used for a single rotatable directional antenna of a regular radio direction finding system. The orientation of the single directional antenna may be controlled manually or automatically. In this case, the second needle 20 is either dispensed with or left idle. "Out" needle 21 is marked "QDM," referring to directional bearings on radio stations tuned-in on the associated directional antenna. Needle 21 may be extended, as indicated in dotted lines at 21', to give reciprocal bearings on the radio stations. The letters "QDE" marked on extension 21' refers to such reciprocal bearing indications. Corresponding marks, "To" and "From," may optionally be used.

The indicator assembly is housed in the box cture 15, enclosing quadrantal error compensators individually coupled between indicator needles 20, 21 and their respective loop shafts 10, 11. Indicator box 15 is used also as a junction box for carrying meters, control buttons and interconnections between cables from component sections of the radio receiver apparatus. Electrical plug 16 effects electrical connection between external cable 17 and the instruments and wiring of junction box 15, through receptor plug 18.

The dual-needle indicator arrangement of my present invention is associated with other consent components to form a control head for operation as a lateral guidance, runway localizer or direction finder system. The plurality of connections are assembled to facilitate the operation thereof by a busy pilot. Master switch 25 is used to turn the system "on" or "off," and to control the level or volume thereof through variable resistance 24. Meter 26, mounted in an opposite corner of housing 15, is essentially a homing meter or milemeter apprising the pilot when he is properly tuned-in, as well as the relative distance of the aircraft to the station. Meter 26 corresponds to meter 340 of Fig. 9 of the direction system disclosed in my application, Serial No. 291,807.

Toggle switches 27 and 28 are located in another corner of indicator-junction box 15. When toggle switch 27 is moved to position "Nav.," corresponding to "Navigation," the receiver system operated as a normal radio direction indicator, controlling the orientation of one of the directional antennae, e. g. the one coupled to flexible shaft 11 and indicator needle 21. With this position of switch 27, the directional receiver system is placed in circuit connection to move needle 21—21' to give directional bearing indications, while needle 20 remains stationary. When switch 27 is moved to position marked "Land," corresponding to "Landing," the circuit connections within junction box 15 are arranged to convert the receiver into a radio lateral guidance system, such as disclosed in my copending application, Serial No. 291,807. Both indicator needles 20 and 21 are thereupon operated, providing the lateral guidance and runway localizer indications for approach and landing maneuvers. Toggle switch 28 is the noise limiter switch which, when in the "Limiter" position, cuts down the high frequency components attendant with noisy signal reception.

In the fourth corner of the face of indicator-control head 15 is located manual "Bearing" control 29 for adjusting the position of annular movable scale 30 of the indicator. The use of control knob 29 will be explained hereinafter. A further control is provided through crank 31. Crank 31 is directly coupled to loop shaft 11 for manually changing the position of the associated loop antenna, as will be described. The plurality of controls and indications provided in the compact arrangement are very useful for the busy pilot. Most of the radio-navigation controls and indications are combined on a single head for lateral and directional guidance.

An important feature of my present invention resides in the novel mechanism effecting azimuthal compensation for quadrantal errors for the rotatable loop antennae. Quadrantal errors, as is known to those skilled in the art, result from the usual nonsymmetrical arrangement of nearby metallic objects about the antenna. Quadrantal bearing errors for a particular rotatable antenna installation are determined during the installation thereof on the vehicle. A quadrantal error corrector is incorporated between each of the rotatable loop antennae and its associated indicator needle. The corrector mechanisms disclosed in the novel coaxial arrangement in a single control head are individually useful separately. Such separate application therefor is schematically indicated in my copending application, Serial No. 286,733, filed on July 27, 1939, assigned to the same assignee as this case, particularly in Figs. 7, 8 and 9 thereof.

Fig. 2, a bottom plan view of the indicator-control head with the base removed, shows the coaxially arranged quadrantal error compensators for the loop antennae connected to flexible cables 10 and 11, and indicator needles 20 and 21. Fig. 3 is an enlarged cross-sectional view through the indicator-control head. The quadrantal mechanism coupled to cable 10 essentially comprises worm 32 secured on rod 33 directly connected with cable 10 through removable coupling unit 34; worm gear 35 meshed with worm 32; and pivotally linked corrector arms 36, 37, 38, 39 yieldably connecting worm gear 35 with axial rod 40. End 41 of arm 36 is rigidly secured to worm gear 35. Arm 39 is mechanically engaged with axial rod 40 through the frictional arrangement comprising thumb-screw 43 operating in the slotted end 42 of arm 39.

Cam follower 44 is rotatably mounted on the pivotal connection between arms 37 and 38. Follower 44 is arranged to ride against the calibrated inner edge of hollow cam 45. A tension spring 46 is arranged to mechanically bias opposite arms 37 and 39 together to press follower 44 into continuous engagement with the inner cam surface. Indicator needle 20 is secured to the projecting tip of axial rod 40. Cam 45 is calibrated for the quadrantal error corrections to be effected on indicator 20 with respect to the bearing scales A and B in accordance with the corresponding angular positions of the associated loop antenna connected to flexible shaft 10. The calibration procedure for the cam will be described in connection with Fig. 5.

Rotation of the loop antenna connected to cable 10 in accordance with the received radio signals, manually or automatically, correspondingly rotates worm gear 35. Pivoted arms 36, 37, 38, 39 are carried around with gear 35 due to arm 36, rotating indicator rod 40. The angular displacement of rod 40 depends upon the angular position of gear 35 and the relation between cam 45 and its coacting follower 44. The radial displacement of follower 44 depends upon the shape of the engaging edge of cam 45. The angular relation between rod 40 and gear 35 is varied by the radial displacements. A quadrantal error correction, in either the clockwise or counterclockwise direction, is effected between the loop antenna and its indicator needle for any bearing position of the loop antenna, by calibrating the radial contour of the cam so that for each angular position of the loop antenna a corresponding correct reading by the indicator needle is obtained on scales A and B.

A quadrantal error corrector is also arranged between the second loop antenna, coupled to flexible cable 11, and its associated indicator needle 21. The second corrector is similar to the one just described and comprises shaft 50 secured with loop cable 11 through removable coupling 51; worm 52 on shaft 50, meshed with worm gear 53 which is coaxial with rod 40 and located beneath worm gear 35; and pivoted arms 54, 55, 56, 57 coupled between gear 53 and sleeve 58 rotatably concentric about rod 40. Sleeve 58 extends through the indicator to indicator needle 21. Arm 54 is secured with gear 53 at connection 59. Arm 57 is frictionally engaged with tubular needle sleeve 58 through split friction coupling 60 controlled by thumb-screw 61. Cam follower 62 is rotatably mounted at the pivotal junction of arms 55 and 56 to coact with the cammed edge of a cam 65. Tension spring 63, joined between arms 55 and 56 mechanically biases follower 62 radially, against the edge of cam 65.

The two quadrantal error connectors are concentrically and compactly arranged within the unitary control head. The quadrantal error corrections afforded by each cam is effective for its particular loop antenna as installed, and for the frequency range of radio signals it is calibrated. The quadrantal error correctors herein disclosed are rugged, unaffected by vibrational stresses encountered in aircraft flight, and continuous in their quadrantal error compensations over the 360 degree scale. The concentric or coaxial arrangement of the correctors is effected through bell-shaped supporting member 70 having a plurality of successively wider stepped supports for cams 45 and 65, and spider 85. Member 70 may be continuous annularly, or in separate sections with leg portions for receiving the screw mountings for the units it supports. The weight of member 70 is reduced when thus made spoked or discontinuous.

The front face of the indicator control-head comprises three sets of concentric scales. Scale A is stationary, and inscribed on rectangular plate 75. It is graduated in 360 degrees. An adjustable scale B, also graduated in 360 degrees, is inscribed on annular ring 30, concentric with scale A, and floatingly supported in the front face. Scale C is stationary, with a zero index opposite the zero index of scale A, and arranged on fixed central disk 71. Scale C is graduated to enable the pilot to quickly compensate azimuthal scale B for easterly or westerly magnetic variations and deviations. The indications by needles 20, 21 accordingly give correct azimuthal bearings on scale B. The bearings are corrected for magnetic variations and deviations for the vicinity where the readings are taken by the adjustment of scale B, and for quadrantal errors in the radio frequency range used by the quadrantal error compensators.

Central disk 71 is secured to annular flange 68 extending inwardly from the corresponding end of stepped support 70. Bearing 72 in the center of disk 71 serves as one of the supports for the concentric needle shafts 40, 58. The opposite support for the needle shafts is bearing 83 mounted on spider 85. Plate 80 is secured by screws 74 to the outside of step 90 of member 70. Back plate 80 is spacedly secured by screws 81 to front plate 75 with separating spacers 82. Outer face plate 75 is secured to box 15 by screws 74 attached to flanges 73 on the plate. A back cover 86 is secured to indicator box 15 by screws 87 through flanges 88 on the cover.

The spacers 82 provided between front plate 75 and back plate 80 afford a floating support for adjustable annular ring 30 carrying scale B. Scale B is thus controllably mounted between the opposed peripheral edges of disk 71 and plate 75, and between plates 75 and 80. Fig. 4 is an enlarged cross-sectional view through the scale B ring and its control means, taken along the line 4—4 of Fig. 2. Scale member 30 contains an annular projection 76 with gear teeth 77 on its inner peripheral edge for coaction with pinion 78 attached to shaft 79 of control knob 29. The angular position of scale B with respect to scale A is manually adjusted by "Bearing" knob 29. Scale C is used to assist in the setting of scale B to correct for corresponding known magnetic variations and deviations for the vicinity.

The indicator arrangement of the invention is rendered compact by the stepped supporting bell 70, which supports central circular disk 71 on flange 68; plate 80 on step 90; cam 65, on the next wider step 91; cam 45, on the successively wider step 92; and finally spider 85, on the widest step 93. The stepped arrangement of the bell-shaped member 70 presents a rigid integral mechanical structure for the indicator, permitting ready assembly of the components therein, and ready accessibility for servicing and maintenance thereof. The mechanism is supported in operable relationship independently of back cover 86.

A further important feature of the invention resides in the provision of a direct manual control for a loop antenna mechanically connected to an indicator needle and a quadrantal error corrector mechanism. The preferred embodiment provides the manual angular control for the loop antenna connected to flexible cable 11 and the quadrantal error corrector including worm and worm gear 52, 53. Crank handle 31 is an extended portion of rod 50 carrying worm 52. The pilot thus can directly adjust the angular position of the loop antenna independently of the automatic directional receiver, to manually obtain null bearings therewith, or adjust the loop for maximum signal reception to listen to radio signals through rain or static conditions. The indicated bearings of the loop antenna thus adjusted are corrected for magnetic and quadrantal errors.

The quadrantal error compensation effected by the disclosed corrector mechanisms is by a radial displacement of the cam followers to the degree determined by design of the coacting cam surface. Cam followers 44 and 62 are arranged to respectively operate against cams 45 and 65 as shown in Figs. 2 and 3. An outward radial movement of the cam follower produces a corresponding increased indication on the associated indicator needle. Thus, when cam follower 44 moves outwardly radially, central rod 40 attached thereto is moved clockwise by a predetermined amount in correspondence with the radial displacement of follower 44. Indicator needle 20 attached to rod 40 is thus advanced clockwise to give a positive quadrantal error correction, corresponding to the particular position of the loop antenna coupled to worm gear 35. A corresponding negative quadrantal error correction is effected by a decreased cam surface radius with respect to the mean or 0° level of the cam.

A cam blank as supplied with the indicator prior to its quadrantal error calibration is illustrated at 95 in Fig. 5. Cam blank 95 contains three mounting holes 96 for attachment in a predetermined position on the supporting bell 70. Cam blank 95 corresponds to the corrected cams 45 and 65, and are identified by differing outside diameters. The cam blank contains an inscribed annular calibration graph, etched or otherwise imprinted thereon, as shown. The arcuate radial lines, spaced apart by 5° spacings from 0° to 360°, marks out the angular positions for the corrections. 0° is arranged to coincide with the azimuthal 0° of scale A.

The quadrantal error corrections to be imparted by the corrector mechanism are first determined in the usual manner by test measurements for the particular installation and frequency range of radio reception. The curve for correction is then readily plotted out on the graph of cam 95. The spaced concentric circles of the graph, marked 0°, +10°, and −10°, etc., refer to the calibrations, in degrees, clockwise or counterclockwise for each angular position of the indicator and associated loop antenna. The arcuate disposition of the radial markings depends upon the mechanical design and linkage of the corrector mechanism, taking into account the law of radial motion of the cam follower and the corresponding azimuthal compensations it imparts to the needle. After the calibration curve is plotted on the cam graph, the required cam shape is readily derived by cutting out the section of the cam between its peripheral edge 97 and the curve marked on the graph. An irregular calibrated cam surface results, corresponding to for example the irregular surface of cam 45 as shown in Fig. 2.

The indications on scale A give the true course or headings on the radio station, in degrees. In navigation it is preferable to refer the readings to the magnetic compass or directional gyroscope. The compass course heading in degrees, is obtained directly from scale B. Scale B is adjusted by bearing control knob 29 until its index 0° is opposite the angular position on scale C corresponding to the correction for magnetic variation (for the geographic location in which the bearings are taken), as well as for magnetic deviation (for the particular magnetic compass installation). The setting shown in Fig. 1 is for a positive 20° correction, corresponding to a combined westerly magnetic variation and magnetic deviation of 20°. The pilot thus directly obtains the true azimuthal compass course on any angular reading on scale B, and may readily correlate this bearing with the magnetic compass true north heading for his navigating. The bearings by scale B are fully compensated for quadrantal errors due to the radio reception, for magnetic variations of the locality, and for magnetic deviations of the magnetic compass.

I am aware that the invention is amenable to structural changes and rearrangements, as well as for other specific applications falling within the broader spirit and scope thereof. Accordingly I do not intend to be limited except as set forth in the following claims.

I claim:

1. A composite indicating unit of the character described comprising: a first quadrantal error corrector, a rod coupled to said first corrector; a second quadrantal error corrector, a sleeve concentrically arranged about said rod and coupled to said second corrector; a frame rotatably supporting said sleeve and said rod with corresponding ends thereof projecting through to the exterior of the unit; and first and second indicator needles respectively attached to said corresponding ends of said sleeve and rod externally of the unit.

2. A composite indicating unit of the character described comprising: a first quadrantal error corrector, a rod coupled to said first corrector; a second quadrantal error corrector, a sleeve concentrically arranged about said rod and coupled to said second corrector; a frame rotatably supporting said sleeve and said rod with corresponding ends thereof projecting through to the exterior of the unit; first and second indicator needles respectively attached to said corresponding ends of said sleeve and rod externally of the unit; first and second shafts rotatably mounted in said unit, elements fastened to said shafts and respectively coupled with said correctors, and means for coupling said shafts to remote individual rotatable directional antennae; and a crank secured to one of said shafts and extending externally of the unit for manual rotation of the associated directional antenna.

3. A composite indicating unit of the character described comprising: a first quadrantal error corrector, a rod coupled to said first corrector; a second quadrantal error corrector, a sleeve concentrically arranged about said rod and coupled to said second corrector; a frame rotatably supporting said sleeve and said rod with corresponding ends thereof projecting through to the exterior of the unit; first and second indicator needles respectively attached to said corresponding ends of said sleeve and rod externally of the unit; and an adjustable annular scale concentric with said needles for setting-up magnetic reading compenastions, whereby quadrantally and magnetically compensated azimuthal bearings are directly available on a common scale.

4. A composite indicating unit of the character described comprising: a first quadrantal error corrector embodying a first gear and associated first mechanism, a rod coupled to said first mechanism, said gear being rotatably mounted about said rod; a second quadrantal error corrector embodying a second gear and associated second mechanism, a sleeve concentrically arranged about said rod and coupled to said second mechanism; said second gear being rotatably mounted about said sleeve, coaxially with and spaced from said first gear; a frame rotatably supporting said sleeve and said rod with corresponding ends thereof projecting through to the exterior of the unit; and first and second indicators respectively attached to said corresponding ends of said sleeve and rod externally of the unit.

5. A composite indicating unit of the character described comprising: a first quadrantal error corrector, a rod coupled to said first corrector; a second quadrantal error corrector, a sleeve concentrically arranged about said rod and coupled to said second corrector; a frame rotatably supporting said sleeve and said rod with corresponding ends thereof projecting through to the exterior of the unit; first and second indicator needles respectively attached to said corresponding ends of said sleeve and rod externally of the unit; first and second calibrated cams, a supporting bell mounted within the unit spacedly carrying said first and second cams in respective coaction with said first and second correctors to control the relative indications of said needles.

6. A composite indicating unit of the character described comprising: a first quadrantal error corrector embodying a first gear and associated first linkage mechanism, a rod coupled to said first mechanism, said gear being rotatably mounted about said rod; a second quadrantal error corrector embodying a second gear and associated second linkage mechanism, a sleeve concentrically arranged about said rod and coupled to said second mechanism; said second gear being rotatably mounted about said sleeve; a frame rotatably supporting said sleeve and said rod with corresponding ends thereof projecting through to the exterior of the unit; first and second indicator needles respectively attached to said corresponding ends of said sleeve and rod externally of the unit; first and second calibrated cams spacedly mounted within the unit in respective coaction with said first and second mechanisms to control the relative indications of said needles.

7. A composite indicating unit of the character described comprising: a first quadrantal error corrector embodying a first gear and associated first linkage mechanism, a rod coupled to said first mechanism, said gear being rotatably mounted about said rod; a second quadrantal error corrector embodying a second gear and associated second linkage mechanism, a sleeve concentrically arranged about said rod and coupled to said second mechanism; said second gear being rotatably mounted about said sleeve, coaxially with and spaced from said first gear; a frame rotatably supporting said sleeve and said rod with corresponding ends thereof projecting through to the exterior of the unit; first and second indicator needles respectively attached to said corresponding ends of said sleeve and rod externally of the unit; first and second internal calibrated cam plates, a supporting bell mounted within the unit spacedly carrying said first and second plates in respective coaction with said first and second mechanisms to control the relative angular indications of said needles with respect to the angular positions of the associated gears.

8. A composite indicating unit of the character described comprising: a first quadrantal error corrector embodying a first gear and associated first linkage mechanism, a rod coupled to said first mechanism, said gear being rotatably mounted about said rod; a second quadrantal error corrector embodying a second gear and associated second linkage mechanism, a sleeve concentrically arranged about said rod and coupled to said second mechanism; said second gear being rotatably mounted about said sleeve; a frame rotatably supporting said sleeve and said rod with corresponding ends thereof projecting through to the exterior of the unit; first and second indicator needles respectively attached to said corresponding ends of said sleeve and rod externally of the unit; first and second shafts rotatably mounted in said unit, gearing elements fastened on said shafts and respectively engaged with said gears, and means for removably coupling said shafts to remote individual rotatable directional antennae; and first and second calibrated cams spacedly mounted within the unit in respective coaction with said first and second mechanisms to control the relative angular indications of said needles with respect to the angular positions of the associated directional antennae.

9. A composite indicating unit of the character described comprising: a first quadrantal error corrector embodying a first gear and associated first linkage mechanism, a rod coupled to said first mechanism, said gear being rotatably mounted about said rod; a second quadrantal error corrector embodying a second gear and associated second linkage mechanism, a sleeve concentrically arranged about said rod and coupled to said second mechanism; said second gear being rotatably mounted about said sleeve; a frame rotatably supporting said sleeve and said rod with corresponding ends thereof projecting through to the exterior of the unit; first and second indicator needles respectively attached to said corresponding ends of said sleeve and rod externally of the unit; first and second shafts rotatably mounted in said unit, gearing elements fastened on said shafts and respectively engaged with said gears, and means for coupling said shafts to remote individual rotatable directional antennae; and first and second calibrated cams spacedly mounted within the unit in respective coaction with said first and second mechanisms to control the relative angular indications of said needles with respect to the angular positions of the associated directional antenna; and a crank secured to one of said shafts and extending externally of the unit for manual rotation of the associated directional antenna.

WILLIAM P. LEAR.